United States Patent Office 3,024,936
Patented Mar. 13, 1962

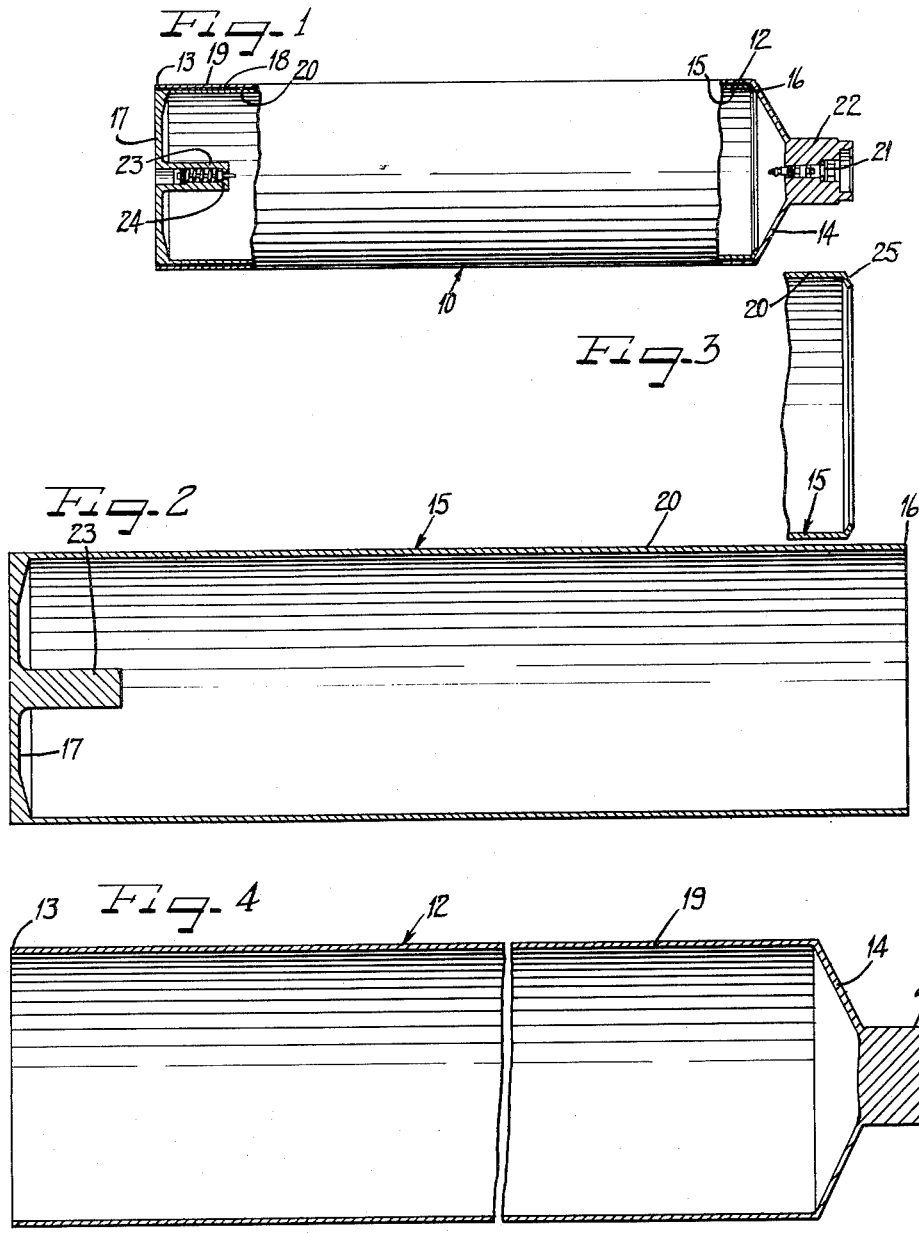

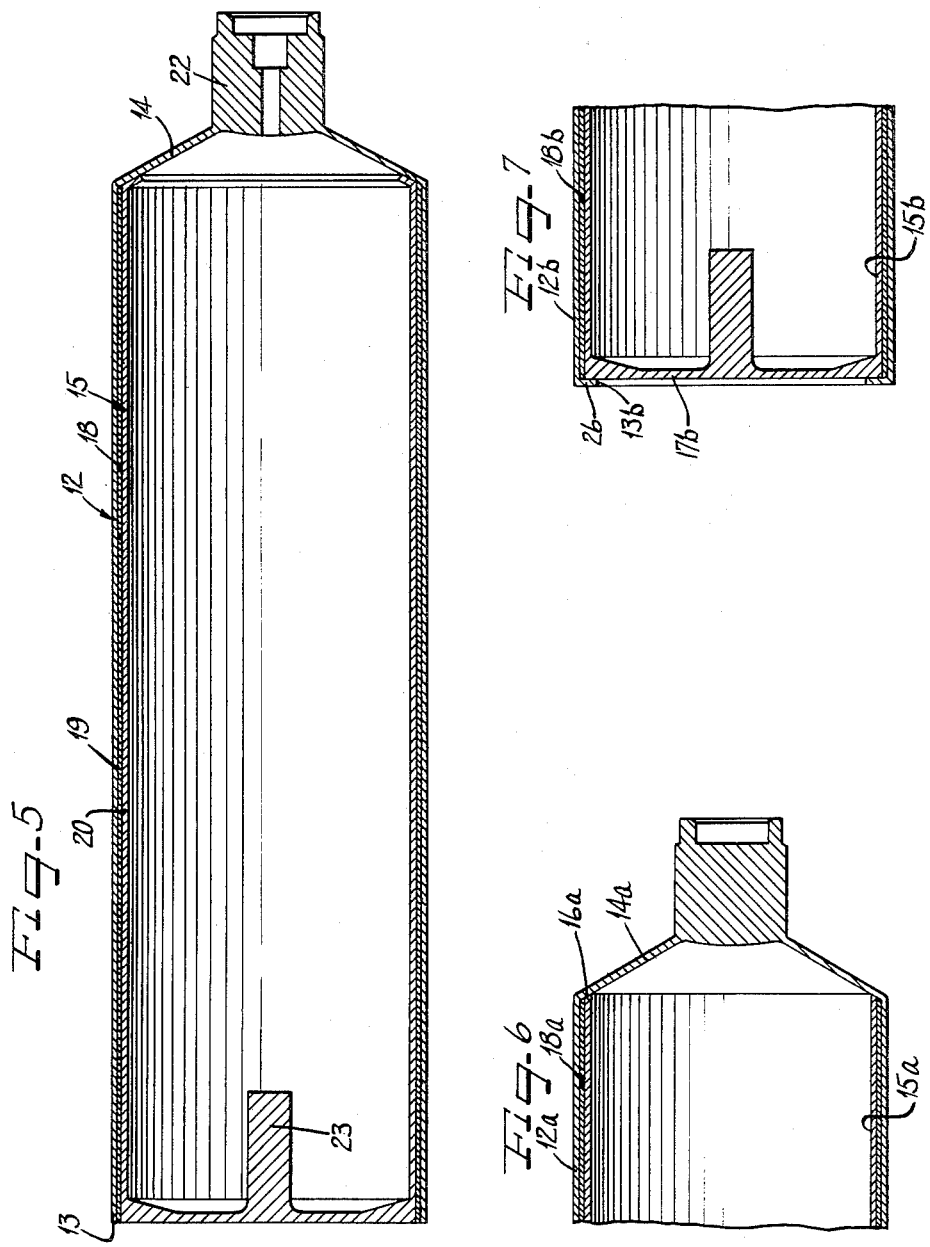

3,024,936
PRESSURE VESSELS AND METHOD OF
MAKING SAME
Clyde C. Logue, Jr., Shaker Heights, Ohio, assignor to Thompson Ramo Wooldridge Inc., a corporation of Ohio
Filed May 9, 1958, Ser. No. 734,309
6 Claims. (Cl. 220—3)

This invention relates to pressure vessels and more particularly to a pressure vessel and method of making the same wherein a pair of cup-shaped impact extrusions are telescoped together for the full length thereof and are held together by a mastic seal in a manner which affords an exceptionally high bursting strength for the cylinder.

Heretofore, pressure cylinders such as are used for containing hydrocarbons such as propane and butane, refrigerants such as Freon and fire extinguishers of the dry type or the $CO_2$ type, have been formed by deep drawing from sheet steel, and have been welded together in three sections. The major problem with such cylinders has been their relatively great expense and their weight, the latter factor resulting in increased shipping costs.

Aluminum cylinders formed by impact extrusion have found application as containers for such materials as aerosol sprays and carbonated beverages, where the maximum pressure before bursting is in the neighborhood of 500 p.s.i. Such impacts are relatively less expensive and lighter weight than the above mentioned multi-section sheet steel structures, although it will be understood that a wide variety of material may be used in the invention. Aluminum impacts have not been used for hydrocarbons such as propane and butane, refrigerants such as Freon and fire-extinguishers, however, because bursting strengths in the range of 500 p.s.i. to 1000 p.s.i. have generally been required for such applications, and present methods of welding and crimping have proved satisfactory only where bursting strengths of up to 500 p.s.i. are needed. The maximum operating pressure for such a cylinder is 300 p.s.i., and each cylinder contains a safety valve set for 450 p.s.i. A safety factor of two is used, which entails a 900 p.s.i. bursting strength, as stated. Both the Heliarc process and welding under water have annealed the aluminum adjacent to the weld. The tensile strength of fully annealed aluminum of 99% purity is 13,000 p.s.i., and the yield strength thereof is 5,000 p.s.i. After cold working in the impact extrusion process, the tensile strength of the aluminum is increased to 24,000 p.s.i., and the yield strength is increased to 22,000 p.s.i. The aluminum is then considered to be strain-hardened to a maximum extent known as H18 temper. This temper is generally required in an aluminum container of the type indicated in order to produce the necessary bursting strength of 900 p.s.i., and any annealing effect reduces the physical properties from maximum values and results in failures.

The cylinder of the present invention overcomes the aforementioned difficulties by providing two full length cup-shaped elements which are preferably aluminum impact extrusion although other materials may be used as indicated. These elements upon completion of trimming and machining thereof, are prepared for assembly by coating the outer element along its inner surface with a mastic sealer, either by dipping or spraying, and coating the inner extrusion upon its outer surface in the same way, or by coating one or the other element as desired. Thereupon, the elements are telescoped together for substantially their full length, and are allowed to set at room temperatures for a period of from 1 to 12 hours.

The mastic seal for this fully extending joint preferably has a shear strength of at least 20 p.s.i., and is impervious to hydrocarbons such as propane and butane, as well as to Freon 12 and Freon 22. It is desirably of low viscosity and will spread thinly so that it affords a minimum clearance between the inner and outer walls of the cylinder, and also maintains a degree of resiliency over a temperature range of from —40° F. to 140° F. The inner and outer extrusions preferably have a section thickness of approximately .020 inch, where aluminum impacts are used in order to provide a .040 inch wall section thickness for the assembled article such as to afford bursting strengths in the desired range. However, the laminated construction of the invention produces a strength which exceeds that of an aluminum wall of equal thickness, particularly in view of the closely spaced telescoping relation between the inner and outer cylinders. It will be understood that where alloys of various kinds are used in a container for applications requiring a bursting strength of, for example, several thousand pounds heat treatment would be required before assembly. The pressure vessel of the invention may also be formed by deep drawing or stamping the elements thereof.

Accordingly, it is an object of the present invention to provide a cylinder which is adapted for use in storing materials such as propane, butane, refrigerants such as Freon or fire extinguishers of the dry type and the $CO_2$ type, as well as other materials and which is suitable for use in a wide variety of applications and for a wide range of pressures.

Another object of the invention is to provide a cylinder as described in which a pair of cup-shaped impact extrusions are telescoped together along the full length thereof and sealed in fixed relationship by a mastic which extends between the inner and outer extrusions to form a laminated construction of great strength.

Another object of the invention is to provide a cylinder as described which may be formed of aluminum impact extrusions and affords a bursting strength of at least 900 p.s.i. while providing an effective seal at each end thereof.

Another object of the invention is to provide a method of constructing a container as described wherein a pair of cup-shaped aluminum cylinders are formed by impact extrusion, the cylinders then being coated with a sealing mastic and the cylinders telescoped together for substantially the entire length of their cylindrical walls, whereupon the mastic is allowed to set to form a laminate therewith.

Other objects and advantages of the invention will become apparent as the description proceeds in accordance with the drawings in which:

FIGURE 1 is a side elevational view, partly in section, of a container according to the present invention;

FIGURE 2 is a section of an inner cylinder for the container;

FIGURE 3 is a fragmentary portion of the cylinder of FIGURE 2 after it has been provided with a flange;

FIGURE 4 is a showing of an outer cylinder for the container of FIGURE 1;

FIGURE 5 is a showing of the cylinders of FIGURES 2 and 4 in telescoped and laminated relationship;

FIGURE 6 is a fragmentary sectional view of a second embodiment of the invention; and FIGURE 7 is a fragmentary sectional view of a further embodiment of the invention.

Referring now to FIGURE 1, a cylinder 10 is shown which is adapted for use in storing gases such as butane, propane, and refrigerants and fire extinguishing fluids or the like. The cylinder 10, which is preferably from 3 to 10 inches in length, comprises an outer cylinder 12 having an open end 13 and a closed end 14 of preferably conical construction, and an inner cylinder 15 of very slightly smaller diameter having an open end 16 and a closed end 17. Cylinder 15 is fully telescoped within the outer extrusion 12 so that its open end 16 abuts the closed end 14 of the cylinder 12, as hereinafter described, and a thin cylindrical sealing layer 18 is disposed between the walls 19 and 20 of the cylinders 12 and 15 respectively. A valve 21 is formed in a protuberant boss 22 extending coaxially from the outer cylinder 12, while the bottom cylinder 15 has an integrally formed, coaxially extending inner boss 23 in which a valve 24 is disposed in accordance with the understanding of those skilled in the art.

Each of the cylinders 12 and 15, is formed in a single stage by impact extrusion from a flat, cylindrically shaped slug. The extrusion process may be carried out at room temperature, although the tooling is heated in the neighborhood of 400° to 500° F. during regular production and certain alloys may require heating prior to extruding. As indicated, where 99% purity aluminum is used for the extrusions 12 and 15, the tensile strength is raised from 13,000 p.s.i. to 24,000 p.s.i. and the yield strength from 5,000 p.s.i. to 22,000 p.s.i. by the extrusion process. The cold working during this process effects a strain hardening of the aluminum to its maximum and is designated as an H18 temper.

If aluminum of this temper were utilized in a container having a wall section of .040 inch, it would afford a bursting strength of 900 p.s.i., which approximates the requisite strength for a vessel of the type desired, and which is necessary for storing propane, butane and the like. In order that the combined walls 19 and 20 of the extrusions 12 and 15 may equal or exceed this value, they are preferably formed to a thickness such that the total thickness is in the neighborhood of .010" to .500" in the particular application described. The laminated construction afforded by the invention, however, provides a bursting strength substantially in excess of the strength indicated by adding the thickness of these walls, as hereinafter set forth, and it will be understood that the conditions hereinabove set forth are in no sense restrictive of the invention, which may be accomplished with a variety of materials.

Suitable mastics should have a shear strength of at least 20 p.s.i.; be impervious to hydrocarbons such as butane, propane; Freons, etc.; have a relatively low viscosity and ability to spread evenly and thinly; cure to form a bond, preferably at room temperatures, in a reasonable time, for example from 1 to 12 hours; form a strong bond even when thinly spread; and have some resiliency over a relatively wide temperature range for example from minus 40° F. to plus 150° F.

Mastics having the above specified properties can be selected from available thermoplastic or thermosetting resin adhesives such as epoxy resins including epoxyphenolic and epoxy-urea systems; polyamide resins; polyester elastomers; neoprenes; polysulfides; styrenes and vinyls. Epoxy resins are especially suitable since they can be cured by cross linking and coupling into thermoset solids of exceptional strengths. Epoxy mastics sold as "Epoxy 3M" by Minnesota Mining and Manufacturing Company and "Cycleweld" manufactured by Chrysler Corporation are especially useful.

In providing the seal 18, a suitable mastic such as "Cycleweld" or Epoxy-3M is applied by spraying or dipping, the extrusion 12 being coated on its inner surface and the extrusion 15 being coated on its outer surface or alternatively only one of these two surfaces is coated. In applications where the container could conceivably be adversely affected by elevated curing temperatures, a mastic such as Armstrong Cork J-1151 is preferred. It may be noted, however, that for containers whose elements have been heat treated, the curing temperature would be as high as the aging temperature in the heat control cycle, e.g. 350°. The inner extrusion 15 is telescoped within the outer extrusion 12 to substantially the maximum extent, and the mastic is allowed to set at room temperature for from 1 to 12 hours. The mastic has a shear strength of at least 20 p.s.i. as stated and is impervious to hydrocarbons and in particular to propane and butane as well as Freon 12 and 22. It is of low viscosity so that it will spread thinly to provide a minimum clearance between the extrusions 12 and 15 and is adapted to maintain a degree of resiliency over a temperature range of from −40° F. to 150° F. Some variation in the process of fabricating the extrusions, and in forming the sealing joint 18, may be effected within the concept of the invention as will be understood by those skilled in the art.

Although the full adhesive joint may be maintained in a construction where the inner, open end 16 of the inner extrusion 15 is trimmed squarely, and brought into firmly abutting relation with the closed end 17 of the cylinder 12 it is desirable to provide a somewhat greater contact between the inner and outer extrusions to protect and reinforce the seal. To this end, as seen in FIGURE 3, the open end 16 may be flanged as at 25 upon completion of the extrusion of cylinder 15. Since the inner extrusion 15 is then telescoped within the outer or top extrusion 12 to the full extent, as stated, the abutting relationship between the outer surface of the flange 25 and the inner surface of the end 14 will provide a desired degree of sealing contact, it being understood that the flange 25 will be inwardly inclined at an angle corresponding to the angle of the closed end 14 of the cylinder 12. There will also be no possibility of leakage, due to the fully extending seal 18.

Referring now to FIGURE 6, an alternative form of the invention is shown wherein the inner cylinder 15a is beveled at its inner, open end 16a, also in complementary relationship to the closed end 14a of the outer cylinder 12a, to provide a suitable degree of sealing engagement therebetween.

As seen in FIGURE 7, another embodiment of the invention provides for protecting the outer exposed portion of the seal 18b so as to augment the sealing action thereof and prevent any possibility of flow. Thus a flange 26 is formed at the open end 13b of the cylinder 12b, which is disposed in sealing engagement with the closed end 17b of the cylinder 15b upon assembly thereof. Because of the relatively thin construction of the inner and outer cylinders of the invention, the flanging process described may be vary readily accomplished, and the full length mastic seal of the invention combines with the inner and outer walls of the cylinder to provide an exceptionally strong laminate, so that materials may be stored which require a container bursting strength in excess of 900 p.s.i. in the applications indicated, it being appreciated that the laminated construction of the invention is also applicable for use where exceptionally high bursting strengths are required. The manufacture and assembly of the cylinder is simply and economically accomplished without the need for unusual parts or involved processes, and the weight of the finished article is relatively light as compared with other cylinders which afford a comparable degree of strength, so that shipping costs are reduced substantially.

Although I have herein set forth and described my invention with respect to certain specific principles and details thereof, it will be obvious to those skilled in the art that these may be varied without departing from the scope of the invention as set forth in the hereunto appended claims.

I claim as my invention:

1. A container comprising a first metal cylinder having an open end and a closed end, a second metal cylinder having an open end and a closed end, said metal cylinders having cylindrical side walls of substantially equal length, said open end of said second cylinder engaging the closed end of said first cylinder in snugly abutting, sealing relationship therewith, said cylindrical side walls being fully telescoped in interfitting relationship, and a mastic seal disposed continuously and uninterruptedly between the cylinder side walls of said first and second cylinder to provide a laminated cylindrical wall construction for said container.

2. In a container, a first metal cylinder having an open end and a closed end, a second metal cylinder having an open end and a closed end, said first and second cylinders having cylindrical side walls of substantially equal length with the cylindrical side wall of the second cylinder being fully received in telescopically interfitting relation within the cylindrical side wall of the first cylinder, the open end of the second cylinder being in snugly abutting engagement with the closed end of the first cylinder, and the first cylinder having an inwardly turned flange at the open end thereof engaging the closed end of the second cylinder in sealing relationship therewith, and a mastic seal between the cylindrical side walls of the first and second cylinders extending continuously and uninterruptedly therearound and defining therewith a laminated container wall.

3. A container for storing materials such as propane and butane under pressure conditions comprising a first cylinder having an open end and a closed end, a second cylinder having an open end and a closed end, said cylinders being formed of aluminum strain-hardened to substantially the maximum extent and each forming a cylindrical side wall with said cylindrical side walls being substntially equal in length, said second cylinder being telescopically received in the first cylinder so that said cylindrical side walls are in fully overlapped, telescopic relationship, the second cylinder having its open end in snugly abutting engagement with the closed end of the first cylinder, and a relatively thin mastic seal extending continuously and uninterruptedly between the cylindrical side walls of the first and second cylinders and providing a laminated cylindrical wall construction for the container.

4. In a container for storing material under pressure and having a high bursting strength, a first metal cylinder having an open end and a closed end, a second metal cylinder having an open end and a closed end, each of said cylinders forming a cylindrical side wall, said cylindrical side walls being of substantially equal length and the side wall of the second cylinder being fully telescopically received in the cylindrical side wall of the first cylinder and in completely overlapping relationship therewith, a flange formed integrally at the open end of the second cylinder and engaging the closed end of the first cylinder in snugly abutting relationship and a thin mastic seal disposed between said first and second cylinders and the cylindrical side walls thereof and providing a laminated construction for said container along the entire length of said cylindrical side walls.

5. A container for storing pressurized fluids comprising a first aluminum cylinder having an open end and a closed end, a second aluminum cylinder having an open end and a closed end, each of said cylinders forming a cylindrical side wall with said side walls being of substantially equal length, the cylindrical side wall of the second aluminum cylinder being fully telescopically received within the cylindrical side wall of the first aluminum cylinder, a thin layer of mastic joining all the interface portions of said cylindrical side walls to form a laminated cylindrical wall for the container, the open end of the second cylinder being engaged in firmly abutting relationship of the closed end of the first cylinder, said laminated cylindrical wall of said container having a cross-sectional thickness of from .010 to .500 inch and having a resistance to internal pressure conditions exceeding the resistance to internal pressure conditions of a correspondingly dimensioned solid aluminum wall.

6. A container for pressurized fluids comprising a first metal cylinder having an open end and a closed end, a second metal cylinder having an open end and a closed end, each of said cylinders having a cylindrical side wall with the cylindrical side walls being of substantially equal length, the cylindrical side wall of the second cylinder being fully telescopically received in the cylindrical side wall of the first cylinder, said second cylinder having a beveled construction at its open end engaging the closed end of the first cylinder in snugly abutting relationship therewith, and a thin mastic seal extending continuously and uninterruptedly circumferentially and axially between the fully overlapped cylindrical side walls of the first and second cylinders.

References Cited in the file of this patent

UNITED STATES PATENTS

| | | |
|---|---|---|
| 895,412 | Badger | Aug. 11, 1908 |
| 1,743,877 | Broido | Jan. 14, 1930 |
| 1,952,705 | Egloff et al. | Mar. 27, 1934 |
| 2,359,446 | Scudder | Oct. 3, 1944 |
| 2,652,943 | Williams | Sept. 22, 1953 |
| 2,789,344 | Kaul | Apr. 23, 1957 |
| 2,809,762 | Cardona | Oct. 15, 1957 |
| 2,895,633 | Zellweger | July 21, 1959 |

FOREIGN PATENTS

| | | |
|---|---|---|
| 778,274 | Great Britain | July 3, 1957 |
| 902,961 | France | Jan. 5, 1945 |